(12) United States Patent
Singh et al.

(10) Patent No.: US 11,347,915 B1
(45) Date of Patent: May 31, 2022

(54) SYSTEM AND METHOD FOR OBJECTIVE PROBING AND GENERATION OF TIMING CONSTRAINTS ASSOCIATED WITH AN ELECTRONIC CIRCUIT DESIGN

(71) Applicant: Cadence Design Systems, Inc., San Jose, CA (US)

(72) Inventors: Sushobhit Singh, Noida (IN); Puneet Munjal, Punjab (IN); Naresh Kumar, Noida (IN)

(73) Assignee: Cadence Design Systems, Inc., San Jose, CA (US)

(*) Notice: Subject to any disclaimer, the term of this patent is extended or adjusted under 35 U.S.C. 154(b) by 0 days.

(21) Appl. No.: 17/338,033

(22) Filed: Jun. 3, 2021

(51) Int. Cl.
*G06F 30/31* (2020.01)
*G06F 119/12* (2020.01)
*G06F 111/20* (2020.01)
*G06F 111/04* (2020.01)

(52) U.S. Cl.
CPC ......... *G06F 30/31* (2020.01); *G06F 2111/04* (2020.01); *G06F 2111/20* (2020.01); *G06F 2119/12* (2020.01)

(58) Field of Classification Search
CPC .......................................................... G06F 30/31
USPC .......................................................... 716/102
See application file for complete search history.

(56) References Cited

U.S. PATENT DOCUMENTS 6,058,252 A * 5/2000 Noll .................. G06F 30/3312
716/113

* cited by examiner

*Primary Examiner* — Eric D Lee
(74) *Attorney, Agent, or Firm* — Mark H. Whittenberger, Esq.; Holland & Knight LLP

(57) ABSTRACT

The present disclosure relates to a method for use with an electronic design. Embodiments may include receiving an electronic design having a plurality of objects associated therewith. Embodiments may further include allowing, at a graphical user interface, a user to define at least one user-refined filter selected from the group consisting of an instance pin filter, a library cell instance filter, a clock pin filter, and a net filter. Embodiments may also include generating one or more constraints based upon, at least in part, the user-refined filter.

20 Claims, 8 Drawing Sheets

SYSTEM AND METHOD FOR OBJECTIVE PROBING AND GENERATION OF TIMING CONSTRAINTS ASSOCIATED WITH AN ELECTRONIC CIRCUIT DESIGN

FIELD OF THE INVENTION

The embodiments of the present disclosure relate to a method of electronic circuit design, and more particularly, to a method for analyzing timing constraints associated with an electronic circuit design.

BACKGROUND

Designing and maintaining timing constraints is an important part of static timing analysis (STA) in both signoff and implementation flows. Electronic circuit designers spend considerable amounts of time and energy in designing and maintaining the timing constraints. Due to the instance counts of modern designs and multiple modes of operation, timing constraints are inherently complicated and substantial. This makes it imperative for STA tools to offer debuggability and provide both macro and micro view of the constraints.

SUMMARY

Accordingly, an embodiment of the present disclosure is directed to a computer-implemented method for use with an electronic design. The method may include receiving an electronic design having a plurality of objects associated therewith. The method may further include allowing, at a graphical user interface, a user to define at least one user-refined filter selected from the group consisting of an instance pin filter, a library cell instance filter, a clock pin filter, and a net filter. The method may also include generating one or more constraints based upon, at least in part, the user-refined filter.

One or more of the following features may be included. In some embodiments, the method may include receiving one or more filtered sets associated with the user-refined filter at a clock filter. The method may further include generating a result set at the clock filter and providing the result set to a view filter. The method may further include applying a library object filter or a command filter to the result set. The method may also include generating one or more timing path constraints based upon, at least in part, the at least one user-refined filter. The method may also include performing an analysis of constraint consistency across multiple instantiations of a module. In some embodiments, the plurality of objects may be selected from the group consisting of instance pins, design primary ports, clock waveform objects, library cell instances, hierarchical instances, library cell arcs, library cell pins, design interconnects, constraint commands, and hierarchical boundary options.

In another embodiment of the present disclosure a computer-readable storage medium having stored thereon instructions, which when executed by a processor result in a number of operations is provided. Operations may include receiving an electronic design having a plurality of objects associated therewith. Operations may further include providing, using a processor, a filter with refined inputs, the filter selected from the group consisting of an instance pin filter, a library cell instance filter, a clock pin filter, and a net filter. Operations may also include generating one or more constraints based upon, at least in part, the filter with refined inputs.

One or more of the following features may be included. In some embodiments, the method may include receiving one or more filtered sets associated with the filter at a clock filter. Operations may further include generating a result set at the clock filter and providing the result set to a view filter. Operations may further include applying a library object filter or a command filter to the result set. Operations may also include generating one or more timing path constraints based upon, at least in part, the at least one filter. Operations may also include performing an analysis of constraint consistency across multiple instantiations of a module. In some embodiments, the plurality of objects may be selected from the group consisting of instance pins, design primary ports, clock waveform objects, library cell instances, hierarchical instances, library cell arcs, library cell pins, design interconnects, constraint commands, and hierarchical boundary options.

In yet another embodiment of the present disclosure a computing system for use in an electronic circuit design is provided. The system may include at least one processor that receives an electronic design having a plurality of objects associated therewith. The system may also include a graphical user interface that allows a user to define at least one user-refined filter selected from the group consisting of an instance pin filter, a library cell instance filter, a clock pin filter, and a net filter. The at least one processor may generate one or more constraints based upon, at least in part, the user-refined filter.

One or more of the following features may be included. In some embodiments, the at least one processor may be configured to receive one or more filtered sets associated with the user-refined filter at a clock filter. The at least one processor may be configured to generate a result set at the clock filter and provide the result set to a view filter. The at least one processor may be configured to apply a library object filter or a command filter to the result set. The at least one processor may be configured to generate one or more timing path constraints based upon, at least in part, the at least one user-refined filter. The at least one processor may be configured to perform an analysis of constraint consistency across multiple instantiations of a module.

It is to be understood that both the foregoing general description and the following detailed description are exemplary and explanatory and are intended to provide further explanation of embodiments of the present disclosure as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

Figure 1:
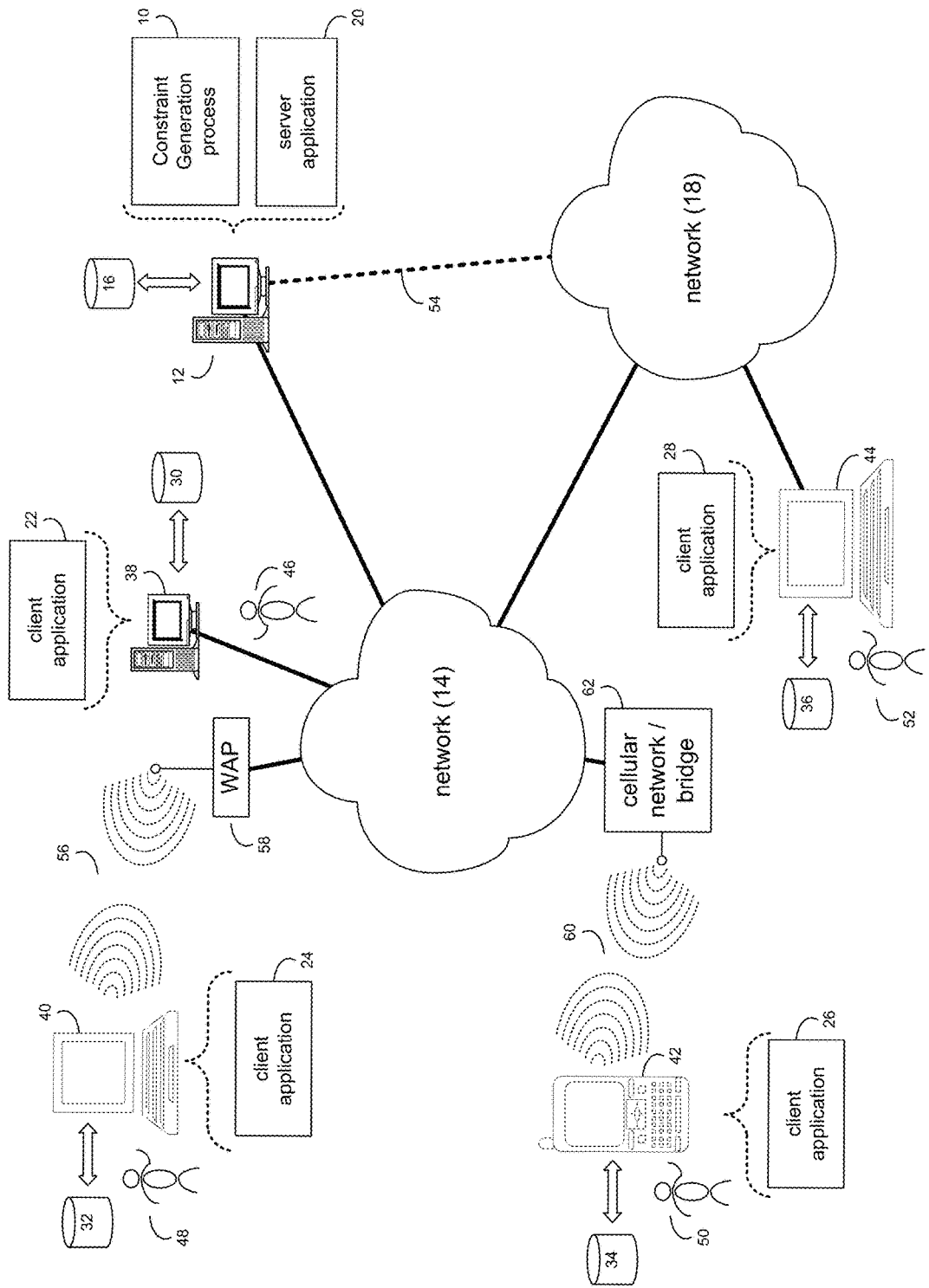
FIG. 1 diagrammatically depicts a constraint generation process coupled to a distributed computing network.

One of the important considerations for timing constraint debugging is the ability to probe relevant constraints on static timing analysis objects such as pins, primary ports, clocks, instances, interconnects and specific timing constraints. This provides the user with a view of the object specific constraints, which not only reduces the turn-around time for constraint debugging but also allows users to have a microscopic view of the constraints where a user may define the focus of a search by including more specified classes of objects. Providing this ability in an EDA application to perform this kind of probing also allows agile debuggability, as very often the issues in timing analysis require probing of timing constraints. Embodiments included herein provide an infrastructure which enables objective constraint probing in various formats for third party consumption and in a summary tabulation format for a quick view.

There is an ever-increasing demand for improved constraint debuggability methods. Working with the constraints applied on the design level and getting the exact constraint definitions is very difficult, as the constraints become cryptic and difficult to manage with maturity in design cycles. Managing the complete set of constraints may become difficult, as the size of constraint files may be very large, and that makes processes literally impossible to handle.

Large constraint size is a problem for customers due to a number of reasons. Due to huge designs and/or databases, disk space is a sparse resource. Moreover, due to disk latency it is often difficult to navigate huge file sizes and any objective evaluation is practically impossible. Further, there are different teams working on constraints and some may be responsible for a specific class of constraints only. For them, working with all of the constraints on disk is a waste of time and resources. A mechanism to generate a leaner set of constraints for such applications is desirable. In addition to the constraint size, there are several more problem areas where a leaner subset of constraints is needed to be generated. For example, netlist transformation steps like in-place optimization (IPO) and others leads to changes in the original design. This requires these applications to query a specific set of constraints from the original netlist and apply them for the changed netlist. This requires an objective query of specific timing constraints by these applications. Further, in hierarchical implementations of high-density designs, it is often necessary to verify iteratively the top and block level constraints for consistency. This requires a method to generate constraints in the top level using the block level object reference. The most common way of probing design timing is through timing reports. There is a growing need for obtaining the relevant timing constraint for a timing path. This requires objective probing constraints for the timing path objects. These are some of the application areas where objective constraint generation becomes a mandatory option.

Accordingly, embodiments of the constraint generation process described herein address these issues. The present disclosure describes an approach to develop a framework of generating the design objects (e.g., pins, instances, clocks, nets and hierarchical boundaries, etc.) to obtain the exact timing constraints impacting the specified objects in a static timing analysis session.

In some embodiments, the framework allows for the writing out of constraints that may be read in an STA session and may include the same timing results as the original constraints.

In some embodiments, the constraints may be written in standard timing constraint formats or using any other tabulated format for a quick view of the constraints.

In some embodiments, the probing framework may generate a microscopic view of the constraints based on the user specification, where the user may couple more than one object class in a single command.

In some embodiments, the probing framework may provide the ability to write a specific set of constraints, as set forth by the user. The probing framework may be configured to provide a simultaneous view of constraints across all views together or using a single view as required by the user. The probing framework may include the requisite speed to work with a reduced set of design objects and hence the timing analysis turnaround time (TAT) of generating the objective constraints and using them should be low.

Reference will now be made in detail to the embodiments of the present disclosure, examples of which are illustrated in the accompanying drawings. The present disclosure may, however, be embodied in many different forms and should not be construed as being limited to the embodiments set forth herein; rather, these embodiments are provided so that this disclosure will be thorough and complete, and will fully convey the concept of the present disclosure to those skilled in the art. In the drawings, the thicknesses of layers and regions may be exaggerated for clarity. Like reference numerals in the drawings denote like elements.

Referring to FIG. 1, there is shown constraint generation process 10 that may reside on and may be executed by server computer 12, which may be connected to network 14 (e.g., the internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft Windows XP Server™; Novell Netware™; or Redhat Linux™, for example. Additionally and/or alternatively, the constraint generation process may reside on a client electronic device, such as a personal computer, notebook computer, personal digital The instruction sets and subroutines of constraint generation process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft IIS™, Novell Webserver™, or Apache Webserver™, that allows for HTTP (i.e., HyperText Transfer Protocol) access to server computer 12 via network 14. Network 14 may be connected to one or more secondary networks (e.g., network 18), examples of which may include but are not limited to: a local area network; a wide area network; or an intranet, for example.

Server computer 12 may execute one or more server applications (e.g., server application 20), examples of which may include but are not limited to, e.g., Lotus Domino™ Server and Microsoft Exchange™ Server. Server application 20 may interact with one or more client applications (e.g., client applications 22, 24, 26, 28) in order to execute constraint generation process 10. Examples of client applications 22, 24, 26, 28 may include, but are not limited to, design verification tools such as those available from the assignee of the present disclosure. These applications may also be executed by server computer 12. In some embodiments, constraint generation process 10 may be a stand-alone application that interfaces with server application 20 or may be an applet/application that is executed within server application 20.

The instruction sets and subroutines of server application 20, which may be stored on storage device 16 coupled to server computer 12, may be executed by one or more processors (not shown) and one or more memory architectures (not shown) incorporated into server computer 12.

As mentioned above, in addition/as an alternative to being a server-based application residing on server computer 12, the constraint generation process may be a client-side application (not shown) residing on one or more client electronic devices 38, 40, 42, 44 (e.g., stored on storage devices 30, 32, 34, 36, respectively). As such, the constraint generation process may be a stand-alone application that interfaces with a client application (e.g., client applications 22, 24, 26, 28), or may be an applet/application that is executed within a client application. As such, the constraint generation process may be a client-side process, a server-side process, or a hybrid client-side/server-side process, which may be executed, in whole or in part, by server computer 12, or one or more of client electronic devices 38, 40, 42, 44.

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID arrays; random access memories (RAM); read-only memories (ROM), compact flash (CF) storage devices, secure digital (SD) storage devices, and memory stick storage devices. Examples of client electronic devices 38, 40, 42, 44 may include, but are not limited to, personal computer 38, laptop computer 40, personal digital assistant 42, notebook computer 44, a data-enabled, cellular telephone (not shown), and a dedicated network device (not shown), for example. Using client applications 22, 24, 26, 28, users 46, 48, 50, 52 may utilize formal analysis, testbench simulation, and/or hybrid technology features verify a particular integrated circuit design.

Users 46, 48, 50, 52 may access server application 20 directly through the device on which the client application (e.g., client applications 22, 24, 26, 28) is executed, namely client electronic devices 38, 40, 42, 44, for example. Users 46, 48, 50, 52 may access server application 20 directly through network 14 or through secondary network 18. Further, server computer 12 (e.g., the computer that executes server application 20) may be connected to network 14 through secondary network 18, as illustrated with phantom link line 54.

In some embodiments, constraint generation process 10 may be a cloud-based process as any or all of the operations described herein may occur, in whole, or in part, in the cloud or as part of a cloud-based system. The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (CSMA/CA) for path sharing. The various 802.11x specifications may use phase-shift keying (PSK) modulation or complementary code keying (CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows™, Microsoft Windows CE™, Redhat Linux™, Apple iOS, ANDROID, or a custom operating system.

Figure 2:
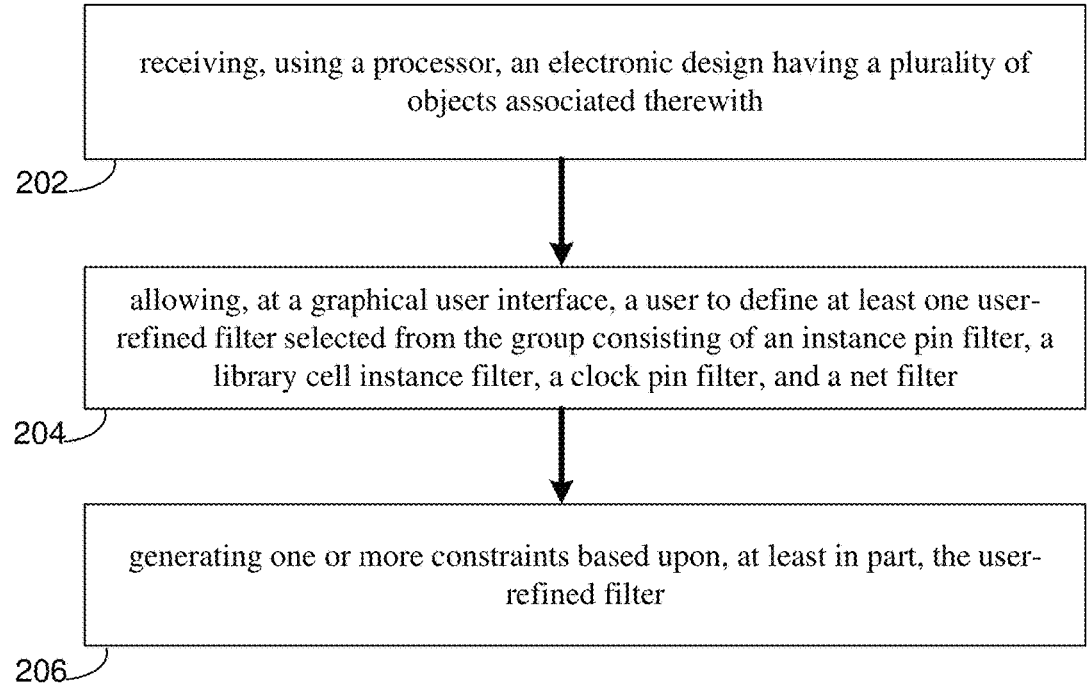
FIG. 2 is an exemplary flowchart of a constraint generation process according to an embodiment of the present disclosure.

Referring now to FIG. 2, a flowchart depicting an embodiment consistent with constraint generation process 10 is provided. The method may include receiving 202 an electronic design having a plurality of objects associated therewith. The method may further include allowing 204, at a graphical user interface, a user to define at least one user-refined filter selected from the group consisting of an instance pin filter, a library cell instance filter, a clock pin filter, and a net filter. The method may also include generating 206 one or more constraints based upon, at least in part, the user-refined filter. Numerous other operations are also within the scope of the present disclosure as provided in further detail hereinbelow.

Figure 3:
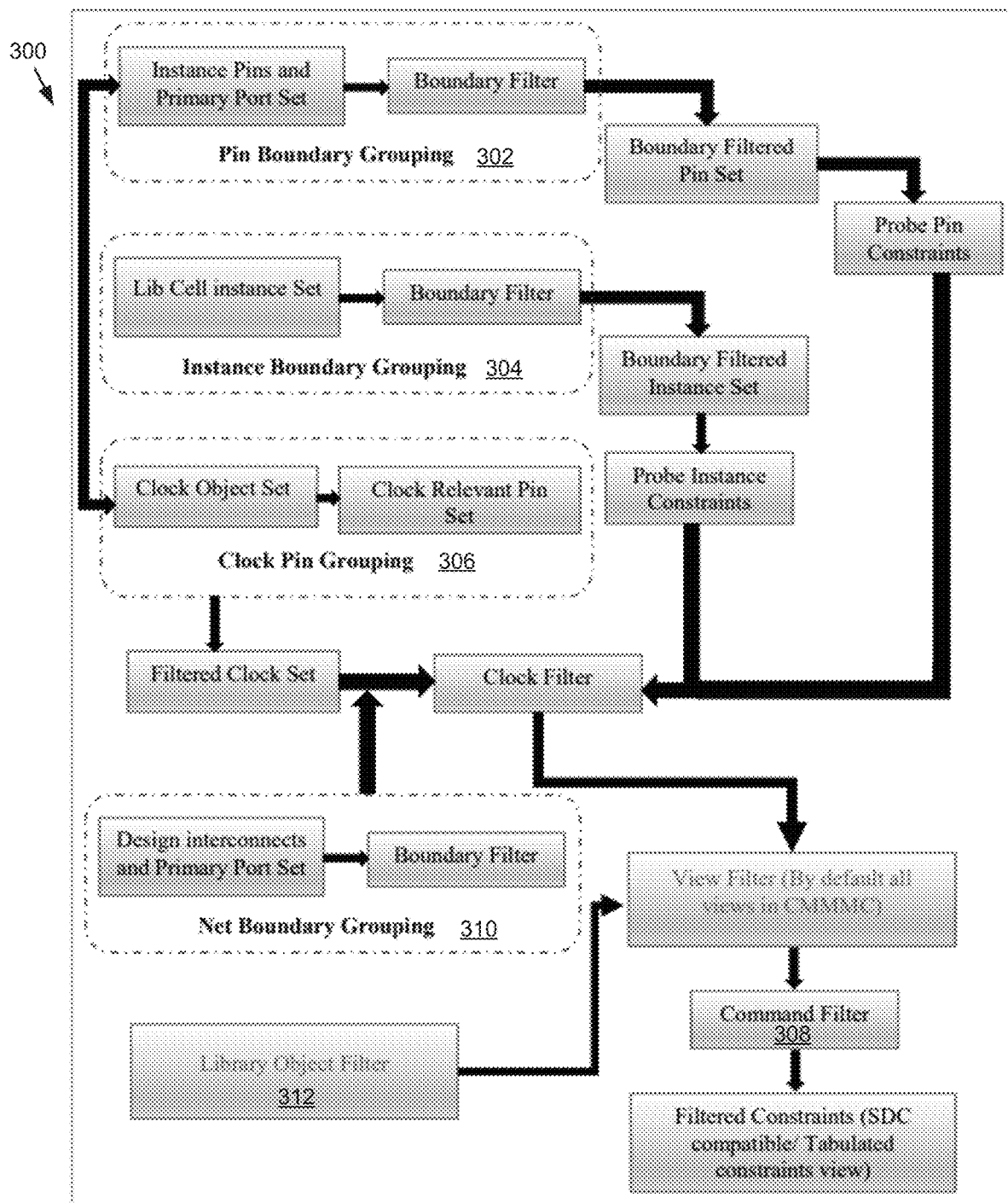
FIG. 3 is another exemplary flowchart of a constraint generation process according to an embodiment of the present disclosure.

Referring now to FIG. 3, a flowchart showing an embodiment of constraint generation process 10 is provided. Embodiments included herein provide an objective constraint generator framework for generating one or more timing constraints based on the timing relevant design objects and specific timing constraints. This is an on-demand constraint generation solution which may generate the constraints in any suitable format, including, but not limited to the Synopsis Design Constraints SDC® format, and all other constraint formats, relevant to the specific design object or a set of design objects.

In some embodiments, constraint generation process 10 may allow for the generation of numerous different constraints for a variety of different design objects. Some design objects may include, but are not limited to, instance pins (e.g., pins of the instances of library cells defined in the netlist), design primary ports (e.g., primary ports of the design), clock waveform objects (e.g., clock definition objects, that can be regular or generated clocks), library cell instances (e.g., instances of the library cells, which may be defined in the circuit netlist), library cell arcs (e.g., arcs in the instances on which the constraints are applied), library cell pins (e.g., the pins of standard library cells which have constraints specified on them), design interconnects (e.g., the nets in design on which the constraints are applied), constraint commands (e.g., this filter may be used for writing the specified subset of the constraint commands in the constraints), hierarchical boundary (e.g., possibility of choosing any hierarchical boundary in the design and writing the constraints specific to the same), etc.

Referring again to FIG. 3, based upon the user inputs, one or more filters may be defined. In some embodiments, these filters may be used to report a set of constraints which satisfy the applicable filtering criterion. This allows constraint generation process 10 to generate one or more constraints corresponding to the intersection of all of the filters. Due to the reduced search space the cost of constraint writing may be reduced considerably, which adds to the agility of constraint probing and subsequent debugging.

Figure 4:
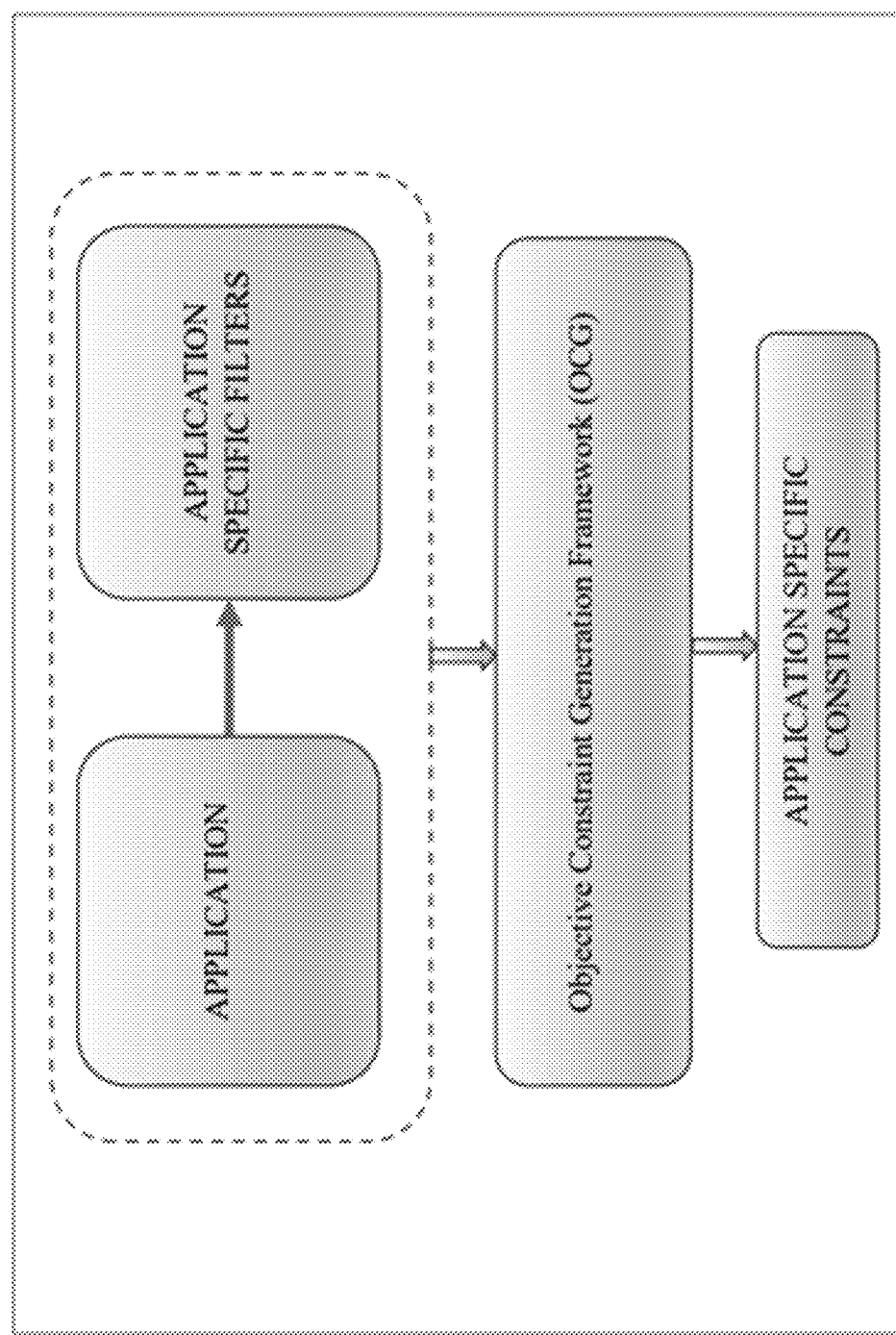
FIG. 4 is yet another exemplary flowchart of a constraint generation process according to an embodiment of the present disclosure.

Referring also to FIG. 4, a flowchart showing application interaction with constraint generation process 10 is provided. One aspect of constraint generation process 10 is that it also produces applicable and relevant constraints, which means that the reduced set of constraints may be read by a timing tool to constrain a reduced part of a netlist, which may be correlated with the full constraint design timing. In general, constraint generation process 10 may be used by applications which have to define the requisite set of filters and upon analyzing the applied filters the constraint generation is done.

As shown in FIG. 3, constraint generation process 10 includes several filtering and grouping processes. Each of these is discussed in further detail hereinbelow. Constraint generation process 10 may include pin boundary grouping process 302. Process 10 may allow a user to provide and/or define a set of pins, pin boundary grouping process 302 may then be configured to filter one or more pins which are not part of a specified hierarchical boundary. The default boundary is the top boundary of the design, this refers to every pin in the electronic design. Once the boundary filtering is applied, the reduced pin set may be used for probing the applicable timing constraints from the timing graph. These constraints may be further subjected to command level filtering, which may filter the unwanted constraint commands from the set of written constraints. In the presence of the hierarchical boundary, constraint generation process 10 may be configured to modify the original constraint such that pins which are not the part of the hierarchical boundary are dropped from the constraint.

Figure 6:
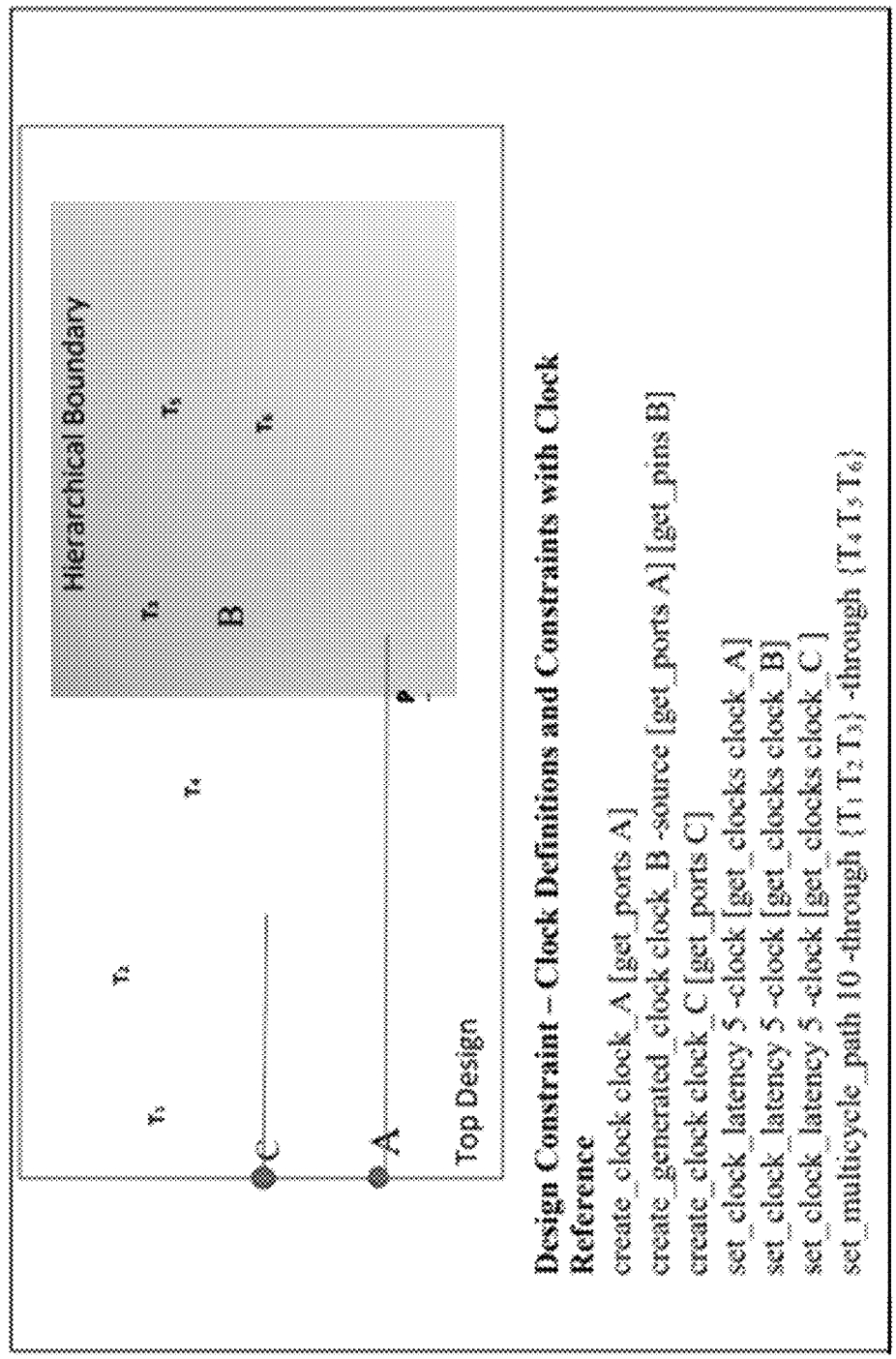
FIG. 6 is a diagram of a hierarchical boundary and design constraint according to an embodiment of the present disclosure.

Referring also to FIG. 6, some example cases are provided below.

Case 1: Constraint Written for the Pin T1 and T2:
generate_objective_constraint (Pin(T1, T2))
Objective Constraints: Constraints to be written for pin T1 and T2, clock and instance set is not provided, so all clocks are written, the constraint on pin T1 and T2 is written.
create_clock clock_A [get_ports A]
create_generated_clock clock_B-source [get_ports A] [get_pins B]
create_clock clock_C [get_ports C]
set_clock_latency 5-clock [get_clocks clock_A]
set_clock_latency 5-clock [get_clocks clock_B]
set_clock_latency 5-clock [get_clocks clock_C]
set_multicycle_path 10-through {T1 T2 T3}-through {T4 T5 T6}

Case 2: Constraint Written for Pin T6 and T3 and Hierarchical Boundary Specified:
generate_objective_constraint (Pin (T6, T3), hierarchical boundary)
Objective Constraints: Constraint are to be written with boundary specified, the clocks are written per boundary (explained more clearly in the section 3), and constraints are modified to fit in the boundary.
create_clock clock_A [get_ports P]
create_generated_clock clock_B-source [get_ports P] [get_pins B]
set_clock_latency 5-clock [get_clocks clock_A]
set_clock_latency 5-clock [get_clocks clock_B]
set_multicycle_path 10-through {T3}-through {T6}

In some embodiments, constraint generation process 10 may include instance boundary grouping process 304. With the set of instances specified by the user, the instances which do not belong to the specified boundary may be filtered from the instance set. The filtered set may be used for probing the constraints on instances. The generated set of constraints may be further subjected to command level filtering thus generating a further subset of the constraints. In some embodiments, there may be a plausible modification of the original constraints when written for a hierarchical boundary, as the instances which are not within the boundary are not considered for constraint writing. Using the instance boundary grouping process may enable the block constraint generation flow.

In some embodiments, constraint generation process 10 may include clock pin grouping process 306. The clocks in the design may be probed from the definition points which are the pins and/or primary ports of the design. With the boundary defined, the clock definition points and/or the clock relevant pin set may be subjected to the pin boundary filter and the clocks which are defined outside the boundary may be filtered out. When clock filtering with a boundary definition, constraint generation process 10 may also capture the clock which may be defined outside the boundary yet is relevant for the boundary, for example, reaching the boundary through any of the hierarchical pins of the specified hierarchical boundary. These hierarchical pins may also be part of the clock relevant pin set. Thus, clock pin grouping process 306 may allow for some clock definitions which part of the original constraints were not come into existence, for the completeness of the objective constraint writing.

Figure 5:
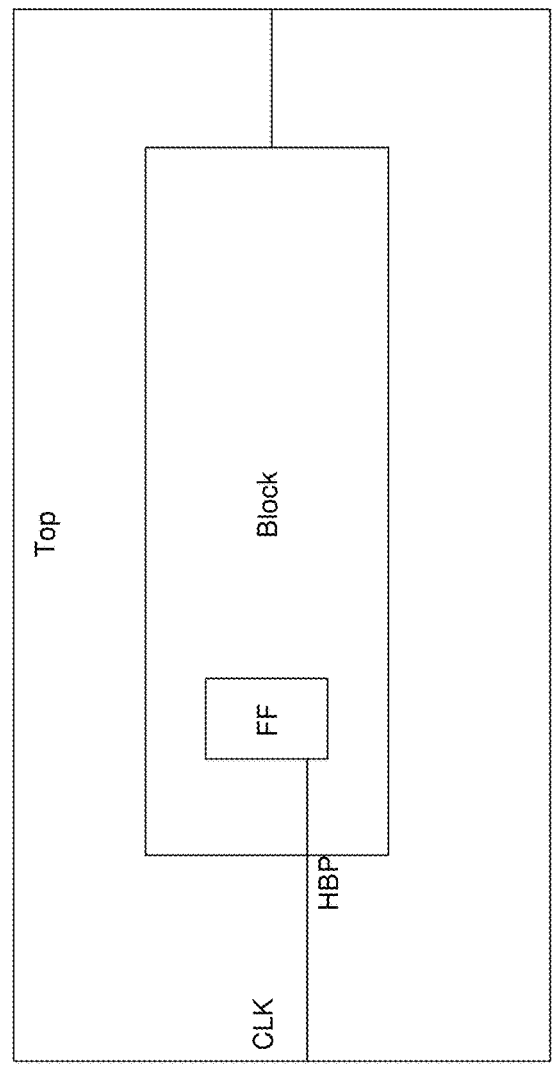
FIG. 5 is a diagram of a block of a design and a clock definition point according to an embodiment of the present disclosure.

FIG. 5 shows an example of a full design denoted by "top" where a block of the design named "block" is also shown. A user may create a clock using a clock definition point denoted by "CLK" in FIG. 5. This clock may drive a flip-flop "FF" inside the block. A hierarchical boundary point "HBP" is shown for the block. In operation, when the constraint probe is working on the hierarchy defined by "block" then it may need to also provide the relevant clock information that is coming from outside the block "CLK", which may be incidental on "HBP".

Referring again to FIG. 6, an example of clock pin grouping process 306, which may be used for identifying the relevant clock related constraints to be written out is provided. In the example provided in FIG. 6 there are three clocks defined on points A, B and C. The clock at point B is the generated clock derived from clock A. Due to clock derivation, clock A is propagating to the boundary. The clock at point C is not entering the boundary. Three different objective constraint writing examples are provided below, which illustrate the process of objective constraint generation in the presence of clock-based filtering.

Case 1: Constraints Written for Clocks A and B and the Hierarchical Boundary:
  generate_objective_constraints (clock (A, B), Hierarchical Boundary)
  Objective Constraints: The hierarchical boundary port P is used for writing clock_A and changes the source pin for clock_B, other constraints which refer these clocks will be written.
  create_clock clock_A [get_ports P]
  create_generated_clock clock_B-source [get_ports P] [get_pins B]
  set_clock_latency 5-clock [get_clocks clock_A]
  set_clock_latency 5-clock [get_clocks clock_B]

Case 2: Constraints Written for Clock A and C, while No Hierarchical Boundary is Specified:
  generate_objective_constraints (clock (A, C))
  Objective Constraints: As there is no hierarchical boundary specified, clock B is dropped while the clock A and clock C, are retained, as per the request.
  create_clock clock_A [get_ports A]
  create_clock clock_C [get_ports C]
  set_clock_latency 5-clock [get_clocks clock_A]
  set_clock_latency 5-clock [get_clocks clock_C]

Case 3: Constraint Generated for the Clock B and C, with a Hierarchical Boundary Specified:
  generate_objective_constraints (clock (B, C), Hierarchical Boundary)
  Objective Constraints: As clock C doesn't either reach the hierarchical boundary, nor is it defined inside the boundary it is not written, while because B is defined from A, the constraint generator may include A in the clock definitions, but may not include constraints which refer A.
  create_clock clock_A [get_ports P]
  create_generated_clock clock_B-source [get_ports A] [get_pins B]
  set_clock_latency 5-clock [get_clocks clock_B]

In some embodiments, once the clock filtering and all other constraints are written out command level filtering 308 may be applied to each of the constraints generated by the objective constraint writing flow. The only constraints which are written in the filtered constraint files are the ones provided in the command level filtering. Some examples of command filtering are provided below.

Case 1: Constraint with the Pins, Clocks and Commands Along with Hierarchical Boundary Specified:
  generate_objective_constraint (Pin(T6, T3), Clock (clock_A), hierarchical boundary, Commands (create_clock, set_multicycle_path))
  Objective Constraints: With command filter applied, the final constraint written out has only the specified set of constraints
  create_clock clock_A [get_ports A]
  set_multicycle_path 10-through {T3}-through {T6}

In some embodiments, constraint generation process 10 may include a net boundary grouping process 310. One or more net boundary filters may be defined for generating one or more constraints specific to design interconnect objects. The boundary filters by default may include the top boundary. However, in some embodiments, when it is defined in the objective constraint filters, those interconnects which lie outside the boundary may be dropped from the generated objective constraints.

In some embodiments, constraint generation process 10 may include library object filtering process 312. Constraints may be applied on the library pins, library cells and library arcs. In some embodiments, library object filtering process 312 may be a generic filter which applies to all of the constraints which are specified or applied on the library objects.

Figure 7:
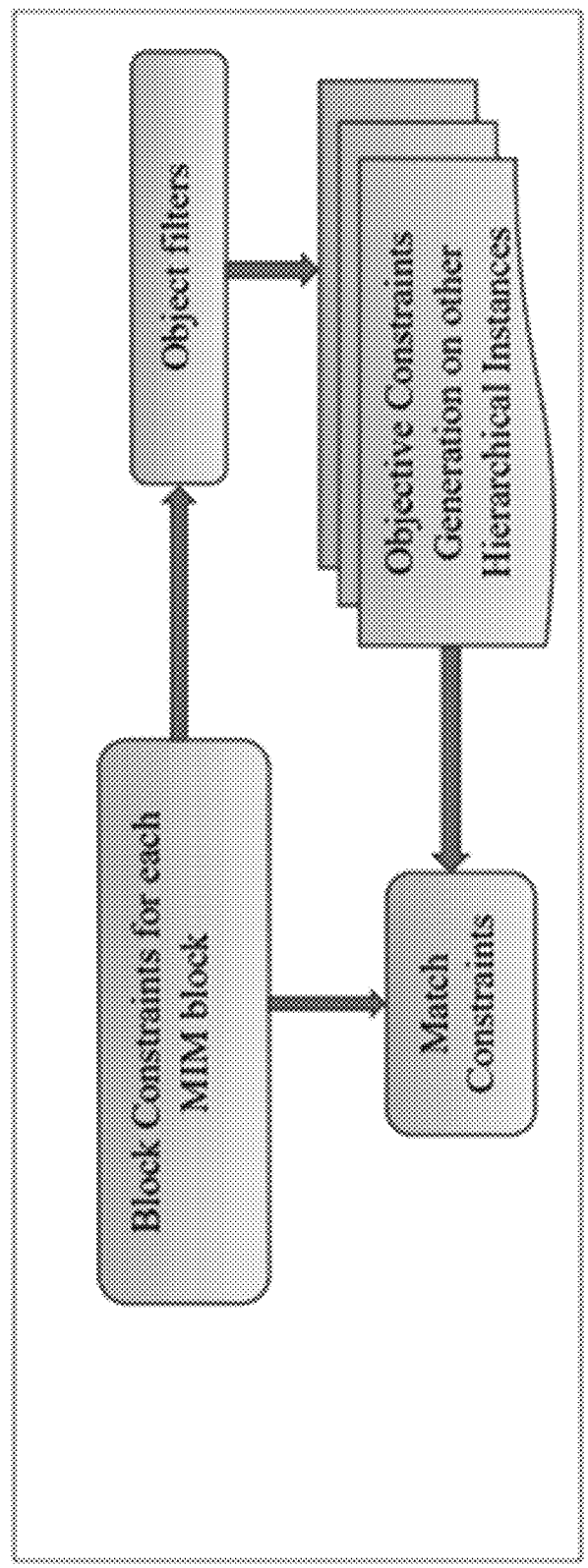
FIG. 7 is an exemplary flowchart of a constraint generation process according to an embodiment of the present disclosure.

Referring now to FIG. 7, a flowchart 700 showing a multi-instance block constraint checker is provided. In the presence of multiple instances of the same module, it is often a challenge for constraint managers to determine if the hierarchical instance level constraints are identical. Accordingly, a multi-instance module ("MIM") constraint checker may be used for checking the block constraints for consistency. The objects on which constraints are defined in the original hierarchical instance may be collected and probed in the other hierarchical instances of the same module. FIG. 7 describes an embodiment of the MIM block constraint checker, which also uses the objective constraint generation framework associated with constraint generation process 10.

In operation, and as shown in FIG. 7, for each of the MIM blocks, constraints may be generated using the hierarchical boundary filters, one of the boundaries acts as the reference or the master boundary, which may be used to generate the reference boundary specific constraints. The MIM checker may be configured to apply the pin and clock filters on the filtered hierarchical boundary specific constraints and then match each of the clock and pin level constraints with the master boundary constraints, and flag errors where there is a mismatch.

Figure 8:
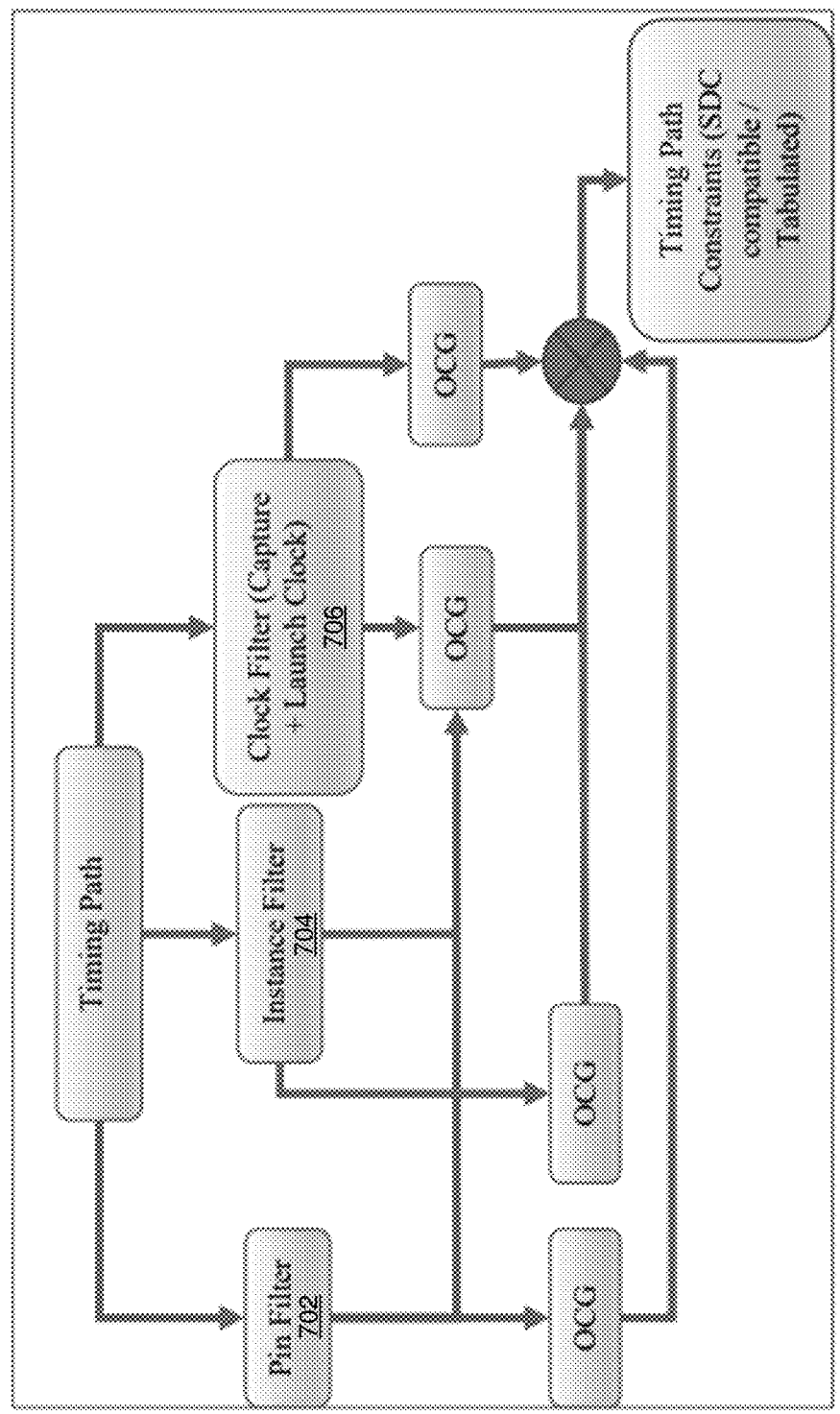
FIG. 8 is another exemplary flowchart of a constraint generation process according to an embodiment of the present disclosure.

In some embodiments, constraint generation process 10 may be used to assist with a timing path debugging process 800. One of the major aspects of debugging a timing path once it is reported, is to access the applicable constraints to the timing path. A method for timing path debugging which may generate the constraints which are plausibly applicable to the timing path, is provided in FIG. 8. The timing path may be reported by a report_timing command and the filters for the pins/ports and clocks may be generated from within the report_timing. These filters may be then fed to the constraint generation process 10, which may generate the constraints for the timing path. The details of the filters which may be generated from the timing path for objective constraint writing, to debug the constraints on the timing path are discussed in further detail hereinbelow.

In operation, timing path debugging process 800 may include a pin filtering process 802. Here, each pin on the launch and capture clock path may form the pin filter set for the objective constraint writing. All of the constraints on the timing pins may be written out by the constraint generator once this pin filter is created. The pin filter may be further classified into a launch and capture pin filter set and constraints may be written out based on that.

In some embodiments, timing path debugging process 800 may also include an instance filtering process 804. Instance filtering process 804 may include one or more unique instances that fall on the timing path. The instance based objective constraints may be written for the timing path. Timing path debugging process 800 may also include a clock filtering process 806. Clock filtering process 806 may include the launch and capture clock of the timing path. Timing path debugging process 800 may also include arc (e.g., net and cell) filtering, wherein net and cell arc objects, which have the constraints applicable to them are generated. Timing path debugging process 800 may also include library cell object filtering processes. This includes one or more filters applied on the library objects including, but not limited to, library arcs, pins and cells. These filters may be executed and those library object specific constraints may be written which are applicable to the path. From the timing path, the path constraint debugger creates the object filters for pins, clocks and instances. There may be multiple objective constraint generation (OCG) steps which occur using the filters individually and with all filters applied, the final timing path constraints is the union of all the OCG results.

In some embodiments, constraint generation process may include receiving an electronic design having a plurality of objects associated therewith. The process may include providing, using a processor, a filter with refined inputs, the filter selected from the group consisting of an instance pin filter, a library cell instance filter, a clock pin filter, and a net filter. The process may then generate one or more constraints based upon, at least in part, the filter with refined inputs.

Accordingly, embodiments included herein may allow adjust one or more constraints based on different filter settings. The different filter settings may be based on user-defined refinement inputs. Additionally and/or alternatively, the filter's refinement inputs may also be based on artificial intelligence, machine learning or other aspects from a computer program, where the process may determine the filter refinements based on earlier runs, data sets, and/or provide suggestions to the user to refine the filter settings.

In some embodiments, constraint generation process 10 may include various graphical user interfaces. For example, a report_timing GUI may be used to create filters from within and pass them to the objective constraint generator, which may write the constraints on disk. Timing reports may be enhanced to add a section which may display the reference to the generated constraints. This provides the user with a view of the actual applied constraints and may enhance the debuggability and user view of the constraints.

Embodiments of constraint generation process 10 provide numerous advantages over existing approaches. There is no existing known framework that can be used to generate a leaner set of timing constraints based on objective probing of design objects, like pins, instances, clocks and hierarchical boundary. Moreover, existing approaches are not able to generate constraints specific to a class of constraints and/or generate an intersection of object-based constraints, making microscopic probing through filtering possible. Existing approaches are also not able to produce a comprehensive view of constraints for specific objects on individual view or across all views.

It will be apparent to those skilled in the art that various modifications and variations can be made in the current estimation scheme and debugging process of embodiments of the present disclosure without departing from the spirit or scope of the invention. Thus, it is intended that embodiments of the present disclosure cover the modifications and variations of this invention provided they come within the scope of the appended claims and their equivalents.

What is claimed is:

1. A computer-implemented method for use with an electronic design comprising:
receiving, using a processor, an electronic design having a plurality of objects associated therewith;
allowing, at a graphical user interface, a user to define at least one user-refined filter selected from the group consisting of an instance pin filter, a library cell instance filter, a clock pin filter, and a net filter; and
generating one or more constraints based upon, at least in part, the user-refined filter.

2. The computer-implemented method of claim 1, further comprising:
receiving one or more filtered sets associated with the user-refined filter at a clock filter.

3. The computer-implemented method of claim 2, further comprising:
generating a result set at the clock filter; and
providing the result set to a view filter.

4. The computer-implemented method of claim 3, further comprising:
applying a library object filter or a command filter to the result set.

5. The computer-implemented method of claim 1, further comprising:
generating one or more timing path constraints based upon, at least in part, the at least one user-refined filter.

6. The computer-implemented method of claim 1, further comprising:
performing an analysis of constraint consistency across multiple instantiations of a module.

7. The computer-implemented method of claim 1, wherein the plurality of objects is selected from the group consisting of instance pins, design primary ports, clock waveform objects, library cell instances, hierarchical instances, library cell arcs, library cell pins, design interconnects, constraint commands, and hierarchical boundary options.

8. A computer-readable storage medium having stored thereon instructions, which when executed by a processor result in the following operations:
receiving, using a processor, an electronic design having a plurality of objects associated therewith;
providing, using a processor, a filter with refined inputs, the filter selected from the group consisting of an instance pin filter, a library cell instance filter, a clock pin filter, and a net filter; and
generating one or more constraints based upon, at least in part, the filter with refined inputs.

9. The computer-readable storage medium of claim 8, further comprising:
receiving one or more filtered sets associated with the filter at a clock filter.

10. The computer-readable storage medium of claim 9, further comprising:
generating a result set at the clock filter; and
providing the result set to a view filter.

11. The computer-readable storage medium of claim 10, further comprising:
applying a library object filter or a command filter to the result set.

12. The computer-readable storage medium of claim 8, further comprising:
generating one or more timing path constraints based upon, at least in part, the at least one filter.

13. The computer-readable storage medium of claim 8, further comprising:
performing an analysis of constraint consistency across multiple instantiations of a module.

14. The computer-readable storage medium of claim 8, wherein the plurality of objects is selected from the group consisting of instance pins, design primary ports, clock waveform objects, library cell instances, hierarchical instances, library cell arcs, library cell pins, design interconnects, constraint commands, and hierarchical boundary options.

15. A computing system for use in an electronic circuit design comprising:
- at least one processor that receives an electronic design having a plurality of objects associated therewith;
- a graphical user interface that allows a user to define at least one user-refined filter selected from the group consisting of an instance pin filter, a library cell instance filter, a clock pin filter, and a net filter; and
- wherein the at least one processor generates one or more constraints based upon, at least in part, the user-refined filter.

16. The computing system of claim 15, wherein the at least one processor is configured to receive one or more filtered sets associated with the user-refined filter at a clock filter.

17. The computing system of claim 16, wherein the at least one processor is configured to generate a result set at the clock filter and provide the result set to a view filter.

18. The computing system of claim 17, wherein the at least one processor is configured to apply a library object filter or a command filter to the result set.

19. The computing system of claim 15, wherein the at least one processor is configured to generate one or more timing path constraints based upon, at least in part, the at least one user-refined filter.

20. The computing system of claim 15, wherein the at least one processor is configured to perform an analysis of constraint consistency across multiple instantiations of a module.

* * * * *